3,394,017
POULTRY FLAVOR COMPOSITION
AND PROCESS
Christopher Giacino, Upper Nyack, N.Y., assignor to International Flavors & Fragrances, Inc., New York, N.Y., a corporation of New York
No Drawing. Continuation-in-part of application Ser. No. 441,916, Mar. 22, 1965. This application Oct. 21, 1965, Ser. No. 500,200
13 Claims. (Cl. 99—140)

ABSTRACT OF THE DISCLOSURE

A poultry flavor composition produced by reacting thiamine with a sulfur containing polypeptide or an amino acid mixture derived therefrom and thereafter adding aldehydes and ketones to said reaction product.

---

This application is a continuation-in-part of my copending application Ser. No. 441,916, filed Mar. 22, 1965, now abandoned, entitled, "Novel Flavoring Composition and Process."

This invention relates to novel meaty flavoring compositions and to the processes for preparing them, and more specifically, it relates to methods for preparing poultry flavor and the products obtained thereby.

Food products enhanced with poultry-like flavors are well-known and have long been used. There is considerable demand for poultry-flavored products in which the actual poultry meat such as chicken, turkey, duck and the like is not needed or is actually undesirable. For example, in the preparation of some sauces and purees, the poultry flavor is desired, but it is necessary to cook the food with the desired poultry and then to remove the meat by straining or some similar operation to obtain the final product ready for use.

Additionally, where weight, space, and/or storage capability are a problem, e.g., when a convenience food is prepared, the presence of the actual poultry meat may be undesirable because it will deteriorate in storage and spoil the food. Moreover, there are occasions when sterilizing or otherwise preserving the natural product is extremely deleterious to the flavor of the natural material, and the desired natural flavor is lost.

This invention provides methods for the production of poultry flavors which are indistinguisable from the natural flavor.

This invention also provides essentially natural poultry flavors which are suitable for incorporation into a wide range of foodstuffs.

Further and more specific objects, features and advantages will clearly appear from the detailed description given below, taken in connection with the accompanying examples which illustrate certain preferred embodiments of this invention.

In one aspect of this invention an edible flavor composition is produced by heating a reaction mixture of a sulfur-containing polypeptide and thiamine to produce a reaction product. This heating is carried out for a period of time sufficient to develop a flavor of poultry or fowl in the mixture. The edible reaction products produced by this process are novel poultry flavoring materials, or bases, and can also produce other sweet meaty flavor notes. Edible compositions having enhanced flavor and which comprise a food and the aforesaid reaction product are further contemplated by this invention.

This invention comprises the novel compositions and component mixtures comprised in such compositions, as well as the novel processes and steps of processes according to which such compositions can be manufactured, specific embodiments of which are described hereinafter by way of example only and in accordance with what is now considered to be the preferred manner of practicing the invention.

The term "polypeptide" as used herein means a lower polypeptide, such as a dipeptide or tripeptide, and includes a mixture of amino acids which compose said polypeptide. Glutathione is illustrative of such a polypeptide and a mixture of glycine, cysteine and glutamic acid is exemplary of a mixture of amino acids which compose such a polypeptide. It will be understood herein that such a mixture of amino acids need not contain each acid in the proportion in which the acid is obtained by the breakdown of a peptide. Thus, while equal parts of glycine, cysteine, and glutamic acid are produced from glutathione, a mixture of one part of gylcine, three parts of cysteine, and one part of glutamic acid can be utilized and is intended to be encompossed herein by the term "polypeptide." It will be clear that since a sulfur-containing polypeptide is used, an amino acid mixture for use in the practice of this invention comprises at least one sulfur-containing amino acid. In the amino acid mixtures used in this invention, cysteine can be replaced by cystine.

These sulfur-containing polypeptides can be added in admixture with inert materials, such as for example inorganic or organic salts, or they can be added in the form of commercially available materials. Where available, they can also be added in the form of the pure compounds themselves.

In another aspect of this invention the flavor composition can contain certain lower alkyl carbonylic materials. Accordingly, preferred poultry flavor compositions are obtained by a combination of the reaction product described above with a ketonic material and an alkyl aldehyde. The aldehyde and the ketonic material can be admixed with the thiamine and sulfur-containing amino compound prior to the heating to produce the reaction mixture or the aldehydic and ketonic materials can be added to the reaction product. It is generally preferred to add these lower alkyl carbonylic materials after heating the thiamine and sulfur-containing amino compound, since the carbonylic materials are volatile, and losses thereof may occur during the heating.

The ketonic materials used in this invention are butter-flavored and preferably lower alkanones and hydroxy-substituted alkanones containing from about 4 to 8 non-quaternary carbon atoms such as diacetyl, acetylmethyl-carbinol, and acetylpropionyl. The alkyl aldehydes are preferably the lower aldehydes containing from about five to about eight carbon atoms. Especially preferred are pentanal, hexanal, and heptanal.

It will be understood that the sulfur-containing polypeptide, thiamine, and carbonylic materials can be admixed with inert carriers; they can be added in the form in which they are commercially available; or they can be added in pure form. Where thiamine is used, it will be understood that it can be added in such forms as thiamine hydrochloride. Similarly, when individual amino acids are utilized they can be in the form of a substance which will yield them under the reaction conditions. For example, they can be in the form of the hydrochloride.

It has been found in preparing the reaction product of this invention that the ingredients are desirably heated in a vehicle, such as water at reflux temperatures, a triglyceride fat, and the like. Some of the best results are obtained when the ingredients are heated in a triglyceride fat, and accordingly, it is preferred to carry out the process in the presence of a triglyceride fat.

Where triglyceride fats are used in this invention, it will be understood that the term includes esters (generally triesters) of glycerol with fatty acids, the fatty acids predominantly ranging in carbon chain length from about ten carbon atoms to about 22 carbon atoms. The term triglyceride fat will be understood to mean both fats and oils. It is preferred that the triglyceride fats be refined, bleached, and deodorized. The triglyceride fats can be in their natural form or they can be hydrogenated.

In practicing this aspect of the invention quantities of added amino acids, such as $\beta$-alanine, or of nucleotides can be used. The preferred nucleotides used in the practice of this invention are mixtures of disodium inosinate and disodium guanylate. Generally the fat is present in much greater quantity than the other components of the mixture, the quantity of fat usually being on the order of from about ten to over 100 times the weight of the total of the sulfur-containing polypeptide and thiamine present. All parts, percentages, proportions, and ratios herein are by weight, unless otherwise indicated.

Further, the polypeptide and thiamine are preferably used in approximately equal amounts, although it will be understood that either one can exceed the quantity of the other by a factor of five or more. Where L-cysteine is used in conjunction with glycine and glutamic acid, the amounts of glycine and of glutamic acid can range from about 0.1 to about ten times the amount of cysteine used. It will be understood, however, that where both glutamic acid and glycine are used, equal amounts of each are not required. The carbonylic material is present in generally lesser amounts than the amount of the polypeptide. It is preferred that each carbonylic material be present in amounts ranging from about 0.05 to about 0.5 times the amount of the amino compound being used.

The time and temperature used in the practice of the process must be so interrelated that the desired poultry flavor is produced. It has been found in practicing this invention that the desired poultry flavor is marked in many cases, and particularly with the preferred ingredients, by the change in appearance of the mixture to a yellow color. It will be understood that the term "yellow color" means a yellowing of the reaction material beyond its original hue. The formation of a definite brown color in the mixture is to be avoided, for such a color generally indicates that heavy burnt notes which are uncharacteristic of the true poultry flavor have been imparted to the reaction mixture. The reaction is sufficiently easy to control that the proper extent of heating can readily be determined simply by heating the reaction mixture for a sufficient period to produce the desired poultry flavor. In many instances the color formation is a convenient indicator. Where the flavor composition of this invention is added to a food which is to be subsequently heated or cooked, as taught herein, the reaction time can be reduced, and in some of these cases heating the polypeptide and thiamine can even be eliminated.

In practicing this process, it is preferable to utilize temperatures of at least 200° F. in order to accomplish the reaction in a reasonable length of time. Generally, temperature much above 420° F. make the reaction difficult to control and may well produce uncharacteristic burnt notes, even with very short reaction times. Accordingly, it is preferred to carry out the reaction at temperatures of from about 200° F. to about 420° F.

The process can be carried out on a batch basis in small quantities of, say, 50–100 grams or it can be carried out batch-wise on much larger quantities of, say 50 kg. It has been found desirable in large scale production to conduct the heating continuously in high heat transfer-rate heat exchangers. With such exchangers the reaction mixture can quickly be brought to the reaction temperature and then quickly cooled in a second exchanger to a lower temperature at which no further color change will take place. A preferred embodiment of this invention utilizes a scraped-wall heat exchanger. Generally, higher temperatures can be used in high heat transfer-rate heat exchangers than can be used in batch production. The use of temperatures at the upper end of the range in batch production tends to cause localized overheating, rapid reaction and off-flavors and odors. A preferred temperature range for both batch and continuous processes is from about 250° to about 400° F.

The correct time of heating can readily be determined by observation fo the flavor produced and, in many instances, the color. When color is used as an indicium and the heat exchanger is not transparent, the ingredients are fed into the exchanger and the temperature and contact time are adjusted to obtain the preferred yellow coloration of the product. Generally, it is preferred to utilize times on the order of from about one-quarter minute to about three hours. In batch operation, it is preferred to use times on the order of from about ten minutes to about three hours. Shorter times on the order of from about one-quarter to about three minutes at 250°– 400° F. are preferably used in high heat transfer-rate heat exchangers.

The flavor compositions of this invention can be used to flavor gravies, sauces, soups, dressings, salads, aspics, purees, and the like without any further treatment. On the other hand, they can be admixed with carrier materials or with other flavoring ingredients of foodstuffs for incorporation into finished products.

The following examples are given to illustrate embodiments of the invention as it is now preferred to practice it. It will be understood that these examples are illustrative and the invention is not to be considered as restricted thereto except as indicated by the appended claims.

Example I

The following mixture is prepared.

| Ingredients: | Parts |
|---|---|
| Fat | 642.67 |
| Salt | 321.65 |
| Glutamic acid | 5.14 |
| L-cysteine hydrochloride | 10.28 |
| $\beta$-Alanine | 1.28 |
| Glycine | 5.14 |
| Thiamine hydrochloride | 10.28 |
| Mixture of disodium inosinate and disodium guanylate | 3.34 |

One hundred grams of the foregoing mixture is heated for 10–15 minutes at a temperature of about 350–390° F. A yellow color is obtained.

After cooling, 0.12 part of diacetyl and 0.10 part of hexanal are added. The mixture has an excellent chicken flavor. This chicken flavor is suitable for use in gravies, sauces, soups, and the like. In the foregoing reaction mixture, the cysteine can be substituted by cystine or glutathione with excellent results. By varying the proportions of the individual ingredients a number of different poultry flavor notes can be produced. Exemplary of poultry flavor notes produced by the processes of this invention are chicken, turkey, duck, goose, and the like.

While the foregoing example has disclosed novel poultry flavors and the process for obtaining them, it will be understood that this invention is further applicable to the preparation of edible compositions having other types of sweet meaty flavor notes. For example, the method of this invention can also be used to produce pork flavors by slight variations in the proportions of the ingredients. The edible compositions so produced can be combined with other flavor ingredients such as smoky materials to give a bacon flavor or spices to produce a ham flavor or a sausage flavor. Where a pork flavor note is to be produced, the intensity of yellowing produced by heating is generally not as deep as when a poultry flavor is desired.

Example II

To produce an edible composition having a pork flavor note, the following mixture is prepared.

| Ingredient: | Parts |
|---|---|
| Lard | 648.12 |
| Salt | 323.20 |
| β-Alanine | .50 |
| Glutamic acid | 6.4 |
| Glycine | 6.4 |
| Thiamine hydrochloride | 6.4 |
| Mixture of disodium inosinate and disodium guanylate | 2.5 |
| L-cysteine hydrochloride | 6.4 |

About 386 grams of the foregoing mixture is heated at a temperature of 365° F. for five to ten minutes to obtain a light yellow color.

After cooling, 0.04 part of each of diacetyl and hexanal are added to the reaction product. The mixture has an excellent pork flavor. This pork flavor is combined with other materials to produce excellent ham, bacon and sausage flavors. In the foregoing reaction mixture, the cysteine can be substituted by cystine or glutathione with excellent results.

Example III

The following mixture is prepared.

| Ingredients: | Parts |
|---|---|
| Fat | 642.67 |
| Salt | 321.65 |
| Glutamic acid | 5.14 |
| L-cysteine hydrochloride | 10.28 |
| β-Alanine | 1.28 |
| Glycine | 5.14 |
| Thiamine hydrochloride | 10.28 |
| Mixture of disodium inosinate and disodium guanylate | 3.34 |

The foregoing mixture is continuously fed to a scraped-wall heat exchanger where it is heated for ½ minute at 325° F. The mixture is then immediately cooled at 100° F. in a second scraped-wall heat exchanger.

After cooling, 0.12 part of diacetyl and 0.10 part of hexanal are added. The mixture has an excellent chicken flavor which is suitable for use in gravies, sauces, soups, and the like.

Example IV

The following mixture is prepared.

| Ingredients: | Parts |
|---|---|
| Fat | 642.67 |
| Salt | 321.61 |
| Glutathione | 10.00 |
| β-Alanine | 1.28 |
| Thiamine hydrochloride | 10.28 |
| Mixture of sodium inosinate and sodium guanylate | 3.34 |

This mixture is heated as in Example I and after cooling 0.12 part of diacetyl and 0.10 part of hexanal (50% pure) are added. The mixture so produced has a very good chicken flavor.

The novel edible compositions of this invention comprise a food and the novel flavor composition prepared as described above. If desired, the flavor composition can be admixed directly with the food, or it can first be blended with other food additives and then admixed with the food. Additives suitable for admixture with the flavor composition of this invention include carriers, thickeners, condiments, spices, encapsulating agents, vehicles, coloring agents, other flavoring materials, flavor intensifiers, and the like. For example, the flavor compositions of this invention can be admixed with food additives such as alginates, allspice, ascorbic acid, basil, capsicum extract, onion oil, oregano extract, pyroligneous acid, sage oil, sodium citrate, thyme, monosodium glutamate, and the like.

Carriers are useful in extending the flavor compositions of this invention. Such carriers do not appreciably affect the quality of the flavor, but they frequently stabilize the flavor compositions and increase their shelf life. Saccharides such as gum arabic are useful for this purpose, as are mixtures of salts and suitable carbohydrates such as karaya, tragacanth, carboxymethylcellulose, and the like.

In formulating the edible compositions according to this invention, a small but effective amount of the flavor composition is added to the food to impart a chicken, turkey, duckling, pork, or other sweet-type meat flavor. The novel flavor compositions of this invention will also enhance such flavors in food which already has a sweet meaty flavor. It will be understood that the amount of flavor composition used depends upon a variety of factors, and accordingly, can vary over a wide range. The factors which determine the amount of flavor composition of this invention to be used are the intensity of flavor desired, the specific reaction mixture and/or carbonylic materials employed, the reaction conditions, the type of food to which it is added, and the cooking or other treatment to which the total edible composition will be subjected prior to consumption. Generally, from about 0.1 to about 15 parts of the poultry flavor composition is added to each 100 parts of the food to be flavored, and preferably from about 0.2 to about 10 parts of the flavor composition is used for each 100 parts of the food. The flavor composition of this invention can be added to meat-containing or to meatless foods. For example, it can be added to beef, lamb, pork, chicken, turkey, duckling, and the like, or to gravies, ragouts, soups, fricassees, spreads, dips, salads, pot pies, dressings, sauces, pates, purees, snack products such as crackers, marinades, and the like.

Example V

A chicken-flavored bouillon mix is prepared by admixing the following ingredients.

| Ingredient: | Parts |
|---|---|
| Salt—fine | 1.50 |
| Malto-dextrin | 1.10 |
| Monosodium glutamate | 0.40 |
| Vegetable protein hydrolysate | 0.40 |
| Onion flavor | 0.17 |
| Celery stalk powder | 0.10 |
| Celery seed powder | 0.03 |
| Garlic powder | 0.02 |
| White pepper powder | 0.02 |
| Chicken flavor of Example III | 0.50 |

If desired, coloring material can be added to the foregoing mix to obtain the desired shade.

A bouillon is prepared from the foregoing composition by adding 40 parts of boiling water to the mix and stirring to disperse the ingredients. A bouillon having an excellent chicken flavor is obtained.

Example VI

A mix for the preparation of chicken-flavored gravy is prepared by blending the following ingredients.

| Ingredient: | Parts |
|---|---|
| All-purpose flour | 360.0 |
| Cornstarch | 120.0 |
| Non-fat dry milk solids | 80.0 |
| Dextrose | 40.0 |
| Chicken flavor of Example III | 270.0 |
| Monosodium glutamate | 40.0 |
| Onion powder | 16.0 |
| Celery stalk powder | 4.0 |
| Chicken spice | 8.0 |

About 9.7 parts of the gravy mix is thoroughly dispersed in 100 parts of cold water. The dispersion is then brought to a boil and simmered for two minutes. A gravy having an excellent chicken flavor is obtained.

What is claimed is:

1. An edible composition comprising a food and an amount effective to impart a poultry flavor to the composition of the product obtained by heating a mixture of (1) lower sulfur-containing polypeptide or a mixture of amino acids derived therefrom and (2) thiamine, said composition additionally containing a ketonic material selected from the group of alkanones and hydroxy-substituted alkanones, said alkanones and hydroxy-substituted alkanones having from about four to about eight non-quaternary carbon atoms and an alkyl aldehyde having from about five to about eight carbon atoms.

2. The edible composition of claim 1 wherein the reaction product is present in an amount from about 0.1 to about 15 parts by weight for each 100 parts of the food.

3. The edible composition of claim 1 wherein the reaction product is present in an amount from about 0.2 to about 10 parts by weight for each 100 parts of the food.

4. The edible composition of claim 1 wherein the sulfur-containing material is a mixture of cysteine, glycine, and glutamic acid.

5. The edible composition of claim 1 wherein the sulfur-containing material is a mixture of cysteine, glycine, and glutamic acid; the ketonic material is diacetyl; and the aldehyde is hexanal.

6. A poultry flavor composition which is the reaction product obtained by heating a mixture of (1) lower sulfur-containing polypeptide or a mixture of amino acids derived therefrom and (2) thiamine to obtain a yellow color in the mixture and a ketonic material selected from the group of alkanones and hydroxy-substituted alkanones, said alkanones and hydroxy-substituted alkanones having from about four to about eight non-quaternary carbon atoms and an alkyl aldehyde having from about five to about eight carbon atoms.

7. The composition of claim 6 obtained by heating the mixture at a temperature of from about 200° F. to about 420° F.

8. The composition of claim 6 obtained by heating the mixture for from about ten minutes to about three hours.

9. A process which comprises heating a mixture of (1) lower sulfur-containing polypeptide or a mixture of amino acids derived therefrom and (2) thiamine to form a reaction product and adding a ketonic material selected from the group of alkanones and hydroxy-substituted alkanones, said alkanones and hydroxy-substituted alkanones having from about four to about eight non-quaternary carbon atoms and an alkyl aldehyde having from about five to about eight carbon atoms.

10. The process of claim 9 wherein the mixture is heated to a temperature in the range of from about 200° F. to about 420° F.

11. The process of claim 9 wherein the heating is carried out for from about ten minutes to about three hours.

12. The process of claim 9 wherein the heating is carried out in the presence of a triglyceride fat.

13. The process of claim 9 wherein the quantity of fat used is from about 10 to about 100 times the weight of the mixture.

References Cited

UNITED STATES PATENTS

| | | | |
|---|---|---|---|
| 2,918,376 | 12/1959 | May et al. | 99—140 |
| 2,934,437 | 4/1960 | Morton et al. | 99—140 |

OTHER REFERENCES

Chemicals Used in Food Processing, Pub. No. 1274, National Academy of Sciences Research Council, 1965, p. 107 and p. 133.

Jacobs: Chemistry and Technology of Food and Food Products, vol. II, Interscience Publishers, Inc., N.Y., 1951, p. 953.

Altschul: Processed Plant Protein Foodstuffs. Academic Press, Inc. N.Y., 1958, pp. 439–441.

A. LOUIS MONACELL, *Primary Examiner.*

H. H. KLARE, *Assistant Examiner.*